(12) United States Patent
Bai et al.

(10) Patent No.: US 12,183,044 B2
(45) Date of Patent: Dec. 31, 2024

(54) THREE-DIMENSIONAL CONTENT PROCESSING METHODS AND APPARATUS

(71) Applicant: ZTE Corporation, Guangdong (CN)

(72) Inventors: Yaxian Bai, Guangdong (CN); Cheng Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 349 days.

(21) Appl. No.: 17/816,102

(22) Filed: Jul. 29, 2022

(65) Prior Publication Data

US 2022/0366611 A1 Nov. 17, 2022

Related U.S. Application Data

(63) Continuation of application No. PCT/CN2020/098010, filed on Jun. 24, 2020.

(51) Int. Cl.
*G06T 9/00* (2006.01)
*H04N 19/169* (2014.01)
*H04N 19/597* (2014.01)
*H04N 19/70* (2014.01)

(52) U.S. Cl.
CPC ......... *G06T 9/001* (2013.01); *H04N 19/1883* (2014.11); *H04N 19/597* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 6,300,956 B1 | 10/2001 | Apodaca et al. | |
| 8,432,435 B2 | 10/2013 | Ding et al. | |
| 2019/0087979 A1* | 3/2019 | Mammou | H04N 19/597 |
| 2020/0351484 A1* | 11/2020 | Aflaki | G06T 7/41 |

(Continued)

FOREIGN PATENT DOCUMENTS

| | | |
|---|---|---|
| CN | 104616243 | 5/2015 |
| CN | 106462999 A | 2/2017 |

(Continued)

OTHER PUBLICATIONS

An Overview of Ongoing Point Cloud Compression Standardization Activities: Video-Based (V-PCC) and Geometry-based (G-PCC) . Graziosi et al. (Year: 2020).*

(Continued)

*Primary Examiner* — Delomia L Gilliard
(74) *Attorney, Agent, or Firm* — Perkins Coie LLP

(57) ABSTRACT

Methods, systems, and apparatus for processing of three-dimensional visual content are described. One example method of processing three-dimensional content includes parsing a level of detail (LoD) information of a bitstream containing three-dimensional (3D) content that is represented as one geometry sub-bitstream and one or more attribute sub-bitstreams; and generating, based on the LoD information, decoded information by decoding at least a portion of the geometry sub-bitstream and the one or more attribute sub-bitstreams corresponding to a desired level of detail; and reconstructing, using the decoded information, a three-dimensional scene corresponding at least to the desired level of detail. The bitstream conforms to a format organized according to multiple levels of details of the 3D content.

24 Claims, 11 Drawing Sheets

Alternative sub-sample structure 1

Alternative sub-sample structure 2

Alternative sub-sample structure 3

(56) References Cited

U.S. PATENT DOCUMENTS

| | | | | |
|---|---|---|---|---|
| 2021/0142521 | A1* | 5/2021 | Iguchi | G06T 9/00 |
| 2021/0142523 | A1* | 5/2021 | Sugio | G06T 9/001 |
| 2021/0329055 | A1* | 10/2021 | Hur | H04L 65/61 |
| 2021/0366159 | A1* | 11/2021 | Sugio | G06F 7/76 |
| 2022/0058834 | A1* | 2/2022 | Iguchi | H04N 21/854 |
| 2022/0343551 | A1* | 10/2022 | Iguchi | G06T 9/001 |
| 2022/0366611 | A1* | 11/2022 | Bai | H04N 21/4345 |
| 2024/0233190 | A1* | 7/2024 | Joshi | G06T 9/001 |

FOREIGN PATENT DOCUMENTS

| | | | |
|---|---|---|---|
| JP | 2002-507799 | A | 3/2002 |
| JP | 2013-038775 | A | 2/2013 |
| WO | 2019/078000 | | 4/2019 |
| WO | WO-2019243663 | A1 * | 12/2019 |
| WO | 2020/055865 | A1 | 3/2020 |
| WO | 2020/060813 | | 3/2020 |
| WO | 2020/072665 | A1 | 4/2020 |
| WO | 2020/122675 | | 6/2020 |
| WO | 2020/123469 | A1 | 6/2020 |

OTHER PUBLICATIONS

WD of ISO/IEC Carriage of Geometry-based Point Cloud Compression Data. MPEG. (Year: 2020).*

PCC—Systems on Partial Access Metadata for G-PCC based on LoD. Takahashi et al. (Year: 2020).*

International Search Report and Written Opinion International Application No. PCT/CN2020/098010, mailed Mar. 15, 2021 (8 pages).

Office Action for Co-Pending CA Application No. 3,169,708, dated Sep. 27, 2023, 6 pages.

Office Action for co-pending JP Application No. 2022-546010, dated Nov. 1, 2023, 8 pages with unofficial English Summary.

Notification to Grant Patent Right for Invention for Co-Pending CN Application No. 202080093961.5, dated Aug. 19, 2024, 7 pages with machine translation.

Khalil, et al."Scalable Wavelet-based Coding of Irregular Meshes with Interactive Region-of-Interest Support" IEEE Transactions on Circuits and Systems for Video Technology, vol. XX, No. X, 14 pages.

Graziosi, et al. "An overview of ongoing point cloud compression standardization activities: video-based (V-PCC) and geometry-based (G-PCC)" Received Nov. 19, 2019; Revised Mar. 9, 2020, 17 pages.

JPO, Decision to Grant for Japanese Application No. 2022-546010, mailed on Mar. 18, 2024, 5 pages with English translation.

Office Action for Co-Pending CA Application No. 3,169,708, dated Jun. 6, 2024, 3 pages.

Extended European Search Report for EP Application No. 20942278, dated Dec. 16, 2022, 7 pages.

Motion Picture Expert Group, "WD of ISO/IEC 23090-18 Carriage of Geometry-based Point Cloud Compression Data", N19067, ISO/IEC JTC 1/SC 29/WG 11 Coding of moving pictures and audio Convenorship: UNI (Italy), Mar. 31, 2020, 20 pages.

Sony Corporation "(38.1) [PCC-Systems] On partial access metadata for G-PCC based on LoD" ISO/IEC JTC1/SC29/WG11 MPEG2020AJ534M Apr. 2020, Alpbach, AT (Virtual), 6 pages.

Graziosi, et al. "An overview of ongoing point cloud compression standardization activities: video-based (V-PCC) and geometry-based (G-PCC)" Apsipa Transactions on Signal and Information Processing, vol. 9, Jan. 1, 2020, 17 pages.

* cited by examiner

THREE-DIMENSIONAL CONTENT PROCESSING METHODS AND APPARATUS

CROSS-REFERENCE TO RELATED APPLICATION

This patent document is a continuation of and claims benefit of priority to International Application No. PCT/CN2020/098010, filed on Jun. 24, 2020. The entire content of the before-mentioned patent application is incorporated by reference as part of the disclosure of this application.

TECHNICAL FIELD

This patent document is directed to volumetric visual media processing and transmission technologies.

BACKGROUND

Video encoding uses compression tools to encode two-dimensional video frames into a compressed bitstream representation that is more efficient for storing or transporting over a network. Traditional video coding techniques that use two-dimensional video frames for encoding sometimes are inefficient for representation of visual information of a three-dimensional visual scene.

SUMMARY

This patent document describes, among other things, techniques for encoding or decoding a bitstream that includes three-dimensional visual media representation.

In one example aspect, a method of processing three-dimensional content is disclosed. The method includes parsing a level of detail (LoD) information of a bitstream containing three-dimensional (3D) content that is represented as one geometry sub-bitstream and one or more attribute sub-bitstreams, generating, based on the LoD information, decoded information by decoding at least a portion of the geometry sub-bitstream and the one or more attribute sub-bitstreams corresponding to a desired level of detail, and reconstructing, using the decoded information, a three-dimensional scene corresponding at least to the desired level of detail. The bitstream conforms to a format organized according to multiple levels of details of the 3D content.

In another example aspect, a method encoding three-dimensional content is disclosed. The method includes encoding a three-dimensional (3D) content into a bitstream comprising a geometry sub-bitstream and one or more attribute sub-bitstreams organized according to one or more level of details (LoD), and including, in the bitstream, an LoD information indicative of a correspondence between the one or more LoDs and the geometry sub-bitstream and the one or more attribute bitstreams.

In another example aspect, an apparatus for implementing one or more of the above-described methods is disclosed. The apparatus may include a processor configured to implement the described encoding or decoding methods.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
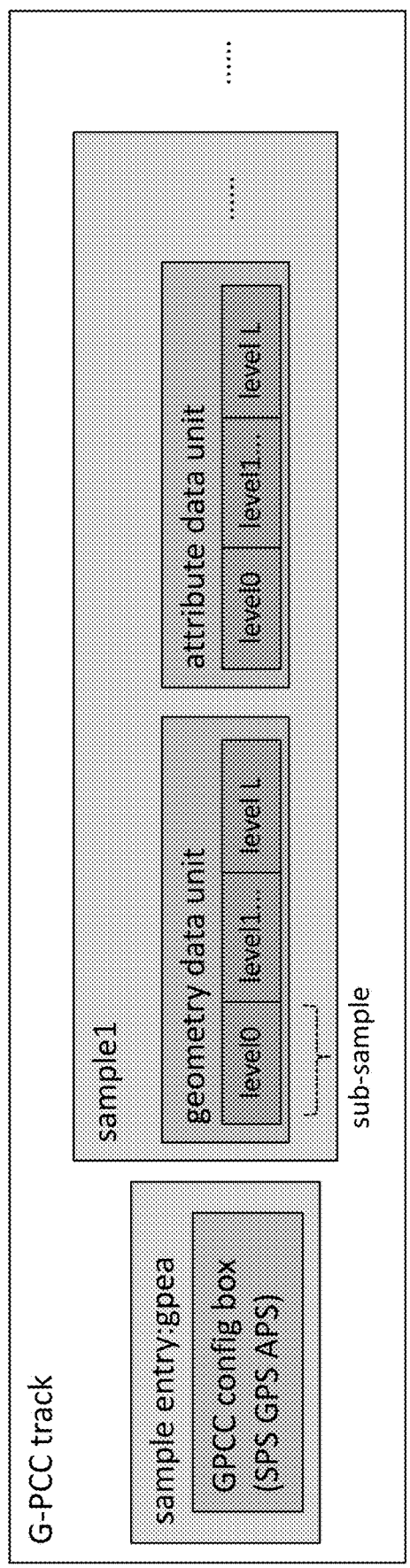
FIG. 1 shows an example structure of a scalable geometry-based point cloud compression (G-PCC) bitstream in which all levels are represented in a single track.

A point cloud is defined as a multi-set of points where a point is described by its 3D position with (x, y, z) coordinates and (optionally) a set of attributes. Typically, each point in a cloud has the same number of attributes attached to it. G-PCC (Geometry-based Point Cloud Compression) represents an efficient compression method of sparse dynamically varying point clouds such as those used in vehicular light detection and ranging (LiDAR) or three-dimensional (3D) mapping, as well as dense static point clouds used in art, science, cultural heritage, and industrial applications. G-PCC may include decomposing the 3D space into a hierarchical structure of cubes and encoding each point as an index of the cube it belongs to.

A G-PCC bitstream (or simply called a bitstream) may be composed of parameter sets (e.g., a sequence parameter set, a geometry parameter set, an attribute parameter set), geometry slices, or attribute slices. In a G-PCC bitstream, a slice is defined as a set of points that can be encoded or decoded independently. For attribute coding, an efficient method named lifting scalability is supported, that enables to partially decode G-PCC bitstream for constructing a point cloud with a desired level of detail (LoD). The LoD may refer to, for example, a resolution of the content. In some cases, the desired LoD may dependent on a spatial portion of the 3D content. In some cases, the desired LoD may depend on temporal properties, e.g., frame rate, of the 3D content.

This patent document describes a structuring and grouping mechanism to indicate the association of G-PCC components with different levels of detail in a bitstream As further described in this patent document, the described techniques can be used to facilitate partial access and delivery of point cloud data based on a desired LoD.

1. Spatial Scalability Functionality of G-PCC

The spatial scalability is important functionality for G-PCC. It is especially useful when the source point cloud is dense even in the local area as the Level of Detail (or, the octree depth) should be large enough to represent the original quality. With the spatial scalability, a viewer can access a lower resolution point cloud as a thumbnail with less decoder complexity and/or with less bandwidth.

When the spatial scalability is needed, it is desirable to decode lower geometry and the corresponding attribute bitstream in a harmonized way. As specified in the latest G-PCC specification, when attribute data is encoded by LoD with a Lifting Transform with lifting scalability enabled, the attribute decoding process allows a pruned octree decode result for the input geometry points. The geometry decoder could decode geometry data unit until the octree depth corresponding to the desired LoD and then stops decoding. After input of the pruned geometry points, the attribute decoder decodes only a part of attribute data unit that corresponds to input geometry points and stops decoding. Consequently, a point cloud with the desired LoD is constructed from partially decoded geometry and attribute data units.

2. Carriage of Scalable G-PCC Bitstream Using ISOBMFF

The G-PCC bitstream may consist of a sequence of type-length-value (TLV) structures that each represents a single coded syntax structure, e.g., geometry payload, attribute payload, a certain type of parameter sets. There may be two types of encapsulation for G-PCC bitstream using the International Standards Organization Base Media File Format (ISOBMFF): Single-track encapsulation and multiple-track encapsulation.

1) Single-Track Encapsulation of G-PCC Data

When the G-PCC bitstream is stored in a single track, each G-PCC sample corresponds to a single point cloud frame and may include one or more TLV encapsulation structures which all belong to the same presentation time. Each TLV encapsulation structure contains a single type of G-PCC payload, e.g., a geometry slice or an attribute slice. Each G-PCC sub-sample may contain only one G-PCC TLV encapsulation structure.

2) Multiple-Track Encapsulation of G-PCC Data

When the G-PCC bitstream is carried in multiple tracks, each geometry or attribute sub-stream (or sub-bitstream) is mapped to an individual track. There are two types of G-PCC component tracks: a geometry track and an attribute track. The geometry track carries a geometry sub-stream (or sub-bitstream) and the attribute track carries a single type of the attribute sub-stream (or sub-bitstream). Each sample in a track contains one TLV encapsulation structure carrying a single G-PCC component data, not both of geometry and attribute data or multiplexing of different attribute data.

For future improvements in availability, performance and efficiency of G-PCC data delivering services across various networks and to customers using a broad range of decoding and viewing devices, it will be beneficial to identify levels of details of G-PCC data at system level. Such techniques described in the present documents will allow encoder embodiments to generate a well-structured bitstream that can be easily parsed by a decoder to select only data that is needed for reconstruction of an encoded 3D scene according to a desired LoD, e.g., as specified by a viewer or by another app such as a vehicle navigation application.

3. Brief Discussion

Section headings are used in the present document only to improve readability and do not limit scope of the disclosed embodiments and techniques in each section to only that section. Certain features are described using the example of the H.264/AVC (advanced video coding) and H.265/HEVC (high efficiency video coding) and MPEG (moving pictured experts group) standards. However, applicability of the disclosed techniques is not limited to only H.264/AVC or H.265/HEVC systems.

In the present document, various syntax elements are disclosed in different sections for point cloud data processing. However, it is understood that a syntax element with same name will have a same format and syntax as used in different sections, unless otherwise noted. Furthermore, the different syntax elements and structures described under different section headings may be combined together in various embodiments. In addition, while the specific structures are described as implementation examples, it will be understood that the order of various entries of syntax structures may be changed, unless otherwise noted in the present document.

In general, embodiments based on the disclosed technique may be used for video data processing. In some embodiments, omnidirectional video data is stored in a file based on an International Organization for Standardization (ISO) basic media file format. Among them, the ISO basic media file format such as the restricted scheme information box, the track reference box, and the track group box can refer to the ISO/IEC JTC1/SC29/WG11 Moving Picture Experts Group (MPEG) MPEG-4. Part 12 ISO Base Media File Format (ISOBMFF) to operate.

All the data in the ISO basic file format is installed in a box. The ISO basic file format represented by an MPEG 4 (MP4) file is composed of several boxes, each of which has a type and a length and can be regarded as a data object. A box can contain another box called a container box. An MP4 file will first have only one "ftyp" type of box, as a markup of the file format and contain some information about the file. There will be and only one "MOOV" type of box (Movie Box), which is a container box whose subbox contains metadata information for the media. The media data of the MP4 file is included in the "mdat" type of media box (Media Data Box), which is also a container box, which may or may not be available (when the media data refers to other files), the structure of the media data is composed of metadata.

A timed metadata track is a mechanism in the ISO Base Media File Format (ISOBMFF) that establishes timed metadata associated with a particular sample. Timed metadata is less coupled to media data and is usually "descriptive."

In the present document, several technical solutions are provided to allow representation of levels of details of a point cloud data, such as the G-PCC data of MPEG, into a format that is compatible with the traditional 2D video formats such as the MP4 or the ISOBMFF format. One advantageous aspect of the proposed solutions is to be able to reuse traditional 2D video techniques and syntax for implementation of the new functionality.

4. Embodiment 1: Partial Access of G-PCC Data Based on LoD

For G-PCC point cloud data that supports spatial scalability, the decoder can decode part of the 3D point cloud data belonging to one or more levels of details. The method of delivering, decoding, and reconstructing 3D point cloud data may include the following steps:

1) The file parser first determines whether the G-PCC point cloud data supports the spatial scalability functionality by parsing the descriptors related to the spatial progressive characteristics in the MPEG-Dash (dynamic adaptive streaming over hypertext transport protocol) Media Presentation Description (MPD) file. It can also read the sample entry of the internal track of the file to determine the current according to the type of sample entry whether the bitstream supports progressive decoding and reconstruction;

2) For bitstreams that support spatial scalability the file parser reads the LoD related information in the point cloud data stream or the point cloud storage files. By parsing the MPD file and LoD related descriptors in it, the file parser concludes which level the Adaptation Set and Representations belong to. LoD values could also be obtained by parsing sample entry or sub-sample information in files.

3) The decoder obtains partial G-PCC data belonging to one or more levels of details from the point cloud data stream or point cloud storage files according to the LoD value, including geometric data, attribute data, parameter sets, and other metadata required for decoding.

3) The decoder decodes lower geometry and the corresponding attribute bitstream in a harmonized way, and thus a 3D point cloud with the desired LoD is constructed.

5. Embodiment 2: All Levels of G-PCC Data in One Track with a Sub-Sample Structure In this embodiment, a scalable G-PCC bitstream is represented by a single track in a file. Each level of G-PCC data is signaled by sub-sample structure.

FIG. 1 shows an example of syntax used by a G-PCC track, showing a sample entry portion and a sample portion (multiple sample portions are possible). The sample portion includes geometry data units of multiple levels of details level 0 to level L, and attribute data units corresponding to level 0 to level L.

The codec_specific_parameters in sub-sample box information is further extended to indicate information of levels of details for partial geometry data unit and a set of attribute data unit that corresponds to the specific LoD.

Figure 2:
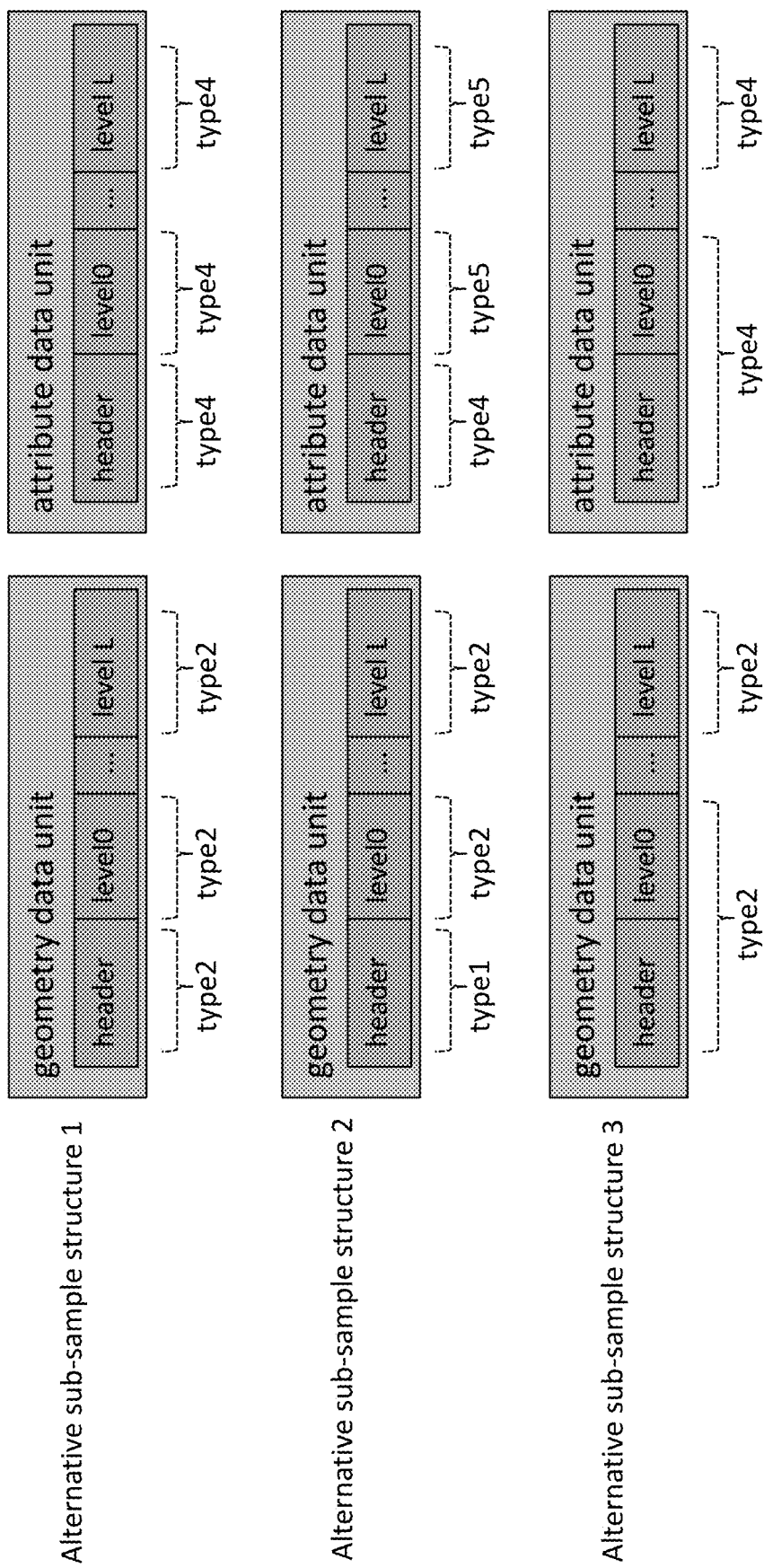
FIG. 2 shows three examples of sub-sample structures.

As shown in FIG. 2, three alternative sub sample structures are listed as follows.
Alternative Sub-Sample Structure 1:
Syntax:
The codec_specific_parameters field of the SubsampleInformationBox is defined as below:

```
unsigned int(8) PayloadType;
if (PayloadType == 2) { // geometry payload
   bit(8) reserved = 0;
   unsigned int(1) lifting_scalability_enabled_flag;
   if (lifting_scalability_enabled_flag) {
      unsigned int(1) is_geometry_data_unit_header;
      if(!is_geometry_data_unit_header)
         unsigned int(14) lod;
      else
         bit(14) reserved = 0;
   }
}
else if (PayloadType == 4) { // attribute payload
   unsigned int(8) AttrIdx;
   unsigned int(1) lifting_scalability_enabled_flag;
   if (lifting_scalability_enabled_flag) {
      unsigned int(1) is_attribute_data_unit_header;
      if(!is_attribute_data_unit_header)
         unsigned int(14) lod;
      else
         bit(14) reserved = 0;
   }
}
else
   bit(24) reserved = 0;
```

PayloadType indicates the tlv_type of the TLV encapsulation structure or a part of that contained in the sub-sample.

NOTE: When PayloadType equals to 2 (geometry data unit), the boundary of one TLV structure can be identified as the boundary of a set of continuous sub-samples with the same PayloadType.

lifting_scalability_enabled_flag equal to 1 when attribute data in the sub-sample or the attribute data associated with geometry data in the sub-sample is encoded by the LoD with Lifting Transform with lifting scalability enabled. Otherwise lifting_scalability_enabled_flag equal to 0.

is_geometry_data_unit_header equal to 1 when the sub-sample only contains geometry data unit header. Is_geometry_data_unit_header equal to 0 when the sub-sample contains part of geometry data unit data which belongs to the same LoD layer.

is_attribute_data_unit_header equal to 1 when the sub-sample only contains attribute data unit header. Is_attribute_data_unit_header equal to 0 when the sub-sample contains part of attractive data unit data which belongs to the same LoD layer.

lod indicates the maximum value of level of detail of the sub-sample, when the TLV encapsulation structure containing geometry payload or attribute payload is decoded from its first sub-sample to this sub-sample.

AttrIdx indicates the ash_attr_sps_attr_idx of the TLV encapsulation structure containing attribute payload in the sub-sample.

Alternative Sub-Sample Structure 2:
Syntax:
The codec_specific_parameters field of the SubsampleInformationBox is defined as below:

```
unsigned int(8) PayloadType;
if (PayloadType == 2) { // geometry payload
   unsigned int(1) lifting_scalability_enabled_flag;
   if (lifting_scalability_enabled_flag) {
      unsigned int(1) geometry_data_unit_header_exist;
      unsigned int(14) lod;
   }
   else
      bit( ) reserved;
}
else if (PayloadType == 4) { // attribute payload
   unsigned int(8) AttrIdx;
   unsigned int(1) lifting_scalability_enabled_flag;
   if (lifting_scalability_enabled_flag) {
      unsigned int(1) attribute_data_unit_header_exist;
      unsigned int(14) lod;
   }
   else
      bit(14) reserved = 0;
}
else
   bit(24) reserved = 0;
```

PayloadType indicates the tlv_type of the TLV encapsulation structure or a part of that contained in the sub-sample.

NOTE: When PayloadType equals to 2 (geometry data unit), the boundary of one TLV structure can be identified as the boundary of a set of continuous sub-samples with the same PayloadType.

lifting_scalability_enabled_flag equal to 1 when attribute data in the sub-sample or the attribute data associated with geometry data in the sub-sample is encoded by the LoD with Lifting Transform with lifting scalability enabled. Otherwise lifting_scalability_enabled_flag equal to 0.

geometry_data_unit_header_exist equal to 1 when the sub-sample contains geometry data unit header, otherwise equal to 0. geometry_data_unit_header_exist shall only be equal to 1 when the value of LoD is the smallest in the sample.

attribute_data_unit_header_exist equal to 1 when the sub-sample contains attribute data unit header, otherwise equal to 0. attribute_data_unit_header_exist shall only be equal to 1 when the value of LoD is the smallest in the sample.

lod indicates the maximum value of level of detail of the sub-sample, when the TLV encapsulation structure containing geometry payload or attribute payload is decoded from its first sub-sample to this sub-sample.

AttrIdx indicates the ash_attr_sps_attr_idx of the TLV encapsulation structure containing attribute payload in the sub-sample.

Alternative Sub-Sample Structure 3:
Syntax:
The codec_specific_parameters field of the SubsampleInformationBox is defined as below:

```
unsigned int(8) GPCC_sub_type;
if (PayloadType == 2) { // geometry payload
    unsigned int(14) lod;
}
else if (PayloadType == 5) { // attribute payload
    unsigned int(8) AttrIdx;
    unsigned int(14) lod;
}
else
    bit(24) reserved = 0;
```

GPCC_sub_type indicates the type of G-PCC data within a sub-sample. Table 1 describes the list of supported data type. Note that GPCC_sub_type 1, 2, 4 and 5 shall only be used when attribute data in the sub-sample or the attribute data associated with geometry data in the sub-sample is encoded by the LoD with Lifting Transform with lifting scalability enabled.

| GPCC_sub_type | Description |
| --- | --- |
| 0 | Complete geometry data unit |
| 1 | Geometry data unit header |
| 2 | Partial geometry data unit data based on LoD value |
| 3 | Complete attribute data unit |
| 4 | Attribute data unit header |
| 5 | Partial attribute data unit data based on LoD value |
| 6 . . . 255 | Reserved | lod indicates the maximum value of level of detail of the sub-sample, when the TLV encapsulation structure containing geometry payload or attribute payload is decoded from its first sub-sample to this sub-sample.

AttrIdx indicates the ash_attr_sps_attr_idx of the TLV encapsulation structure containing attribute payload in the sub-sample.

Implementation 1: Single-Track Encapsulation of G-PCC Geometry Data and Attribute Data Using a Sub-Sample Structure As shown in FIG. 1, one implementation of this embodiment is that G-PCC geometry data and attribute data is carried in a single track and each sample in this track contains one or more G-PCC components with the complete levels of details. The division of each level is signaled in sub-sample structure.

In that case, GPCC tracks uses a VolumetricVisualSampleEntry with a sample entry type of 'gpea' or 'gpe1'. The sample entry of type 'gpe1' is further extended to indicate spatial scalability functionality of G-PCC data. When the decoder is to decode and render a point cloud with its LoD equals to L, then the sub-sample with LoD value less than L is obtained.

FIG. 1 shows single-track encapsulation of G-PCC data using sub-sample structure.

Sample Entry 'gpea'

Under the 'gpea' sample entry, all levels of details of G-PCC geometry data and attribute data are stored in a single track, and information of each level is signaled in sub-sample.

Sample Entry Type: 'gpea'
Container: SampleDescriptionBox
Mandatory: One of 'gpe1', 'gpeg', 'gpcl', 'gpcg', 'gpea', 'gpcl', 'gpes', 'gpcs', 'gpei', and 'gpci' sample entry is mandatory
Quantity: One or more sample entries may be present

```
aligned(8) class GPCCSampleEntry( )
    extends VolumetricVisualSampleEntry ('gpea') {
    GPCCConfigurationBox config; //mandatory
    unsigned int(16) lod;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

lod indicates the maximum value of level of detail of geometry data and attribute data in the track.

Sample Entry 'gpe1'

Under the 'gpe1' sample entry, information of levels of details of G-PCC geometry data and attribute data shall be signaled in sub-sample when the lifting_scalability_enabled_flag is equal to 1.

Sample Entry Type: 'gpe1'
Container: SampleDescriptionBox
Mandatory: One of 'gpe1', 'gpeg', 'gpcl', 'gpcg', 'gpcl', 'gpes', 'gpcs', 'gpei' and 'gpci' sample entry is mandatory
Quantity: One or more sample entries may be present

```
aligned(8) class GPCCSampleEntry( )
    extends VolumetricVisualSampleEntry ('gpe1') {
    GPCCConfigurationBox config; //mandatory
    unsigned int(1) lifting_scalability_enabled_flag;
    if (lifting_scalability_enabled_flag)
        unsigned int(15) lod;
    else
        bit(15) reserved = 0;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

lifting_scalability_enabled_flag equal to 1 when attribute data in the sub-sample or the attribute data associated with geometry data in the sub-sample is encoded by the LoD with Lifting Transform with lifting scalability enabled. Otherwise lifting_scalability_enabled_flag equal to 0.

lod indicates the maximum value of level of detail of geometry data and attribute data in the track.

Figure 3:
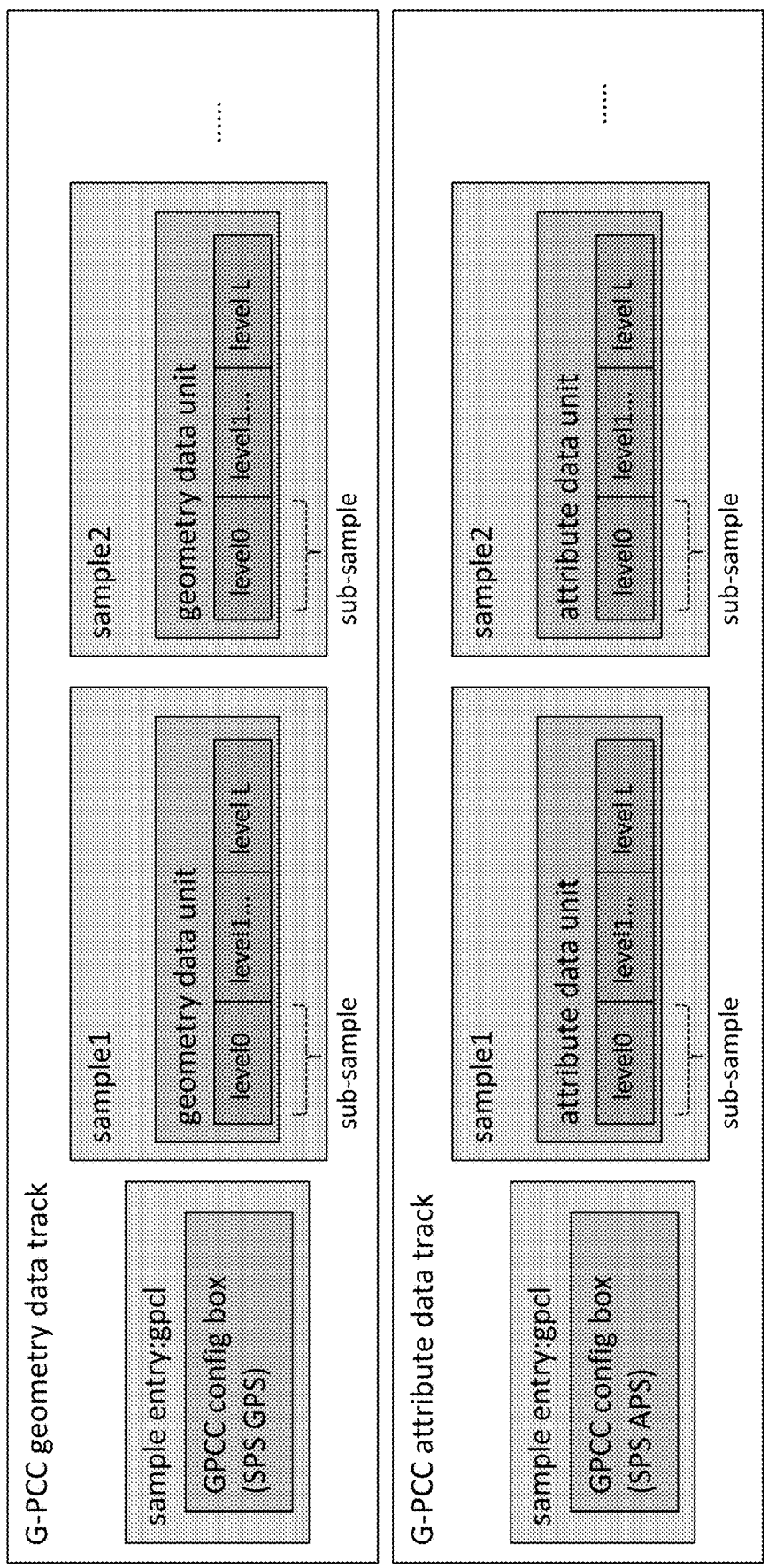
FIG. 3 shows another example structure of a scalable G-PCC bitstream in which all levels are represented in a single track.

Implementation 2: Multi-Track Encapsulation of G-PCC Geometry Data and Attribute Data Using Sub-Sample Structure As shown in FIG. 3, another implementation of this embodiment is that G-PCC geometry data and attribute data is carried in separate tracks and each sample in a single track contains a single type of G-PCC components with the complete levels of details. The division of each level is signaled in sub-sample structure.

In that case, GPCC tracks may use VolumetricVisualSampleEntry with a sample entry type of 'gpcl' or 'gpcl'. The sample entry of type 'gpcl' is further extended to indicate spatial scalability functionality of G-PCC data. When the decoder is to decode and render a point cloud with its LoD equals to L, then the sub-sample with LoD value from 0 to L is obtained.

FIG. 3 shows an example of multi-track encapsulation of G-PCC data using sub-sample structure.

Sample Entry 'gpcl'

Under the 'gpca' sample entry, all levels of details of G-PCC geometry data are stored in a single track, and information of each level is signaled in a sub-sample. Furthermore, each type of attribute data is stored in separate tracks, the storage of LoD information is similar to that of geometry data.

Sample Entry Type: 'gpcl'
Container: SampleDescriptionBox
Mandatory: One of 'gpel', 'gpeg', 'gpcl', 'gpcg', 'gpea', 'gpcl', 'gpes', 'gpcs', 'gpei', and 'gpci' sample entry is mandatory
Quantity: One or more sample entries may be present

```
aligned(8) class GPCCSampleEntry( )
    extends VolumetricVisualSampleEntry ('gpcl') {
    GPCCConfigurationBox config; //mandatory
    GPCCComponentTypeBox type;
    unsigned int(16) lod;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

GPCCComponentTypeBox indicates the type of G-PCC component carried in this track.

lod indicates the maximum value of level of detail of G-PCC component in the track.

Sample Entry 'gpcl'

Under the 'gpcl' sample entry, information of levels of details of G-PCC geometry data and attribute data may be signaled in sub-sample when the lifting_scalability_enabled_flag is equal to 1.

Sample Entry Type: 'gpcl'
Container: SampleDescriptionBox
Mandatory: One of 'gpel', 'gpeg', 'gpcl', 'gpcg', 'gpea', 'gpcl', 'gpes', 'gpcs', 'gpei', and 'gpci' sample entry is mandatory
Quantity: One or more sample entries may be present

```
aligned(8) class GPCCSampleEntry( )
    extends VolumetricVisualSampleEntry ('gpc1') {
    GPCCConfigurationBox config; //mandatory
    GPCCComponentTypeBox type;
    unsigned int(1) lifting_scalability_enabled_flag;
    if (lifting_scalability_enabled_flag)
        unsigned int(15) lod;
    else
        bit(15) reserved = 0;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

GPCCComponentTypeBox indicates the type of G-PCC component carried in this track.

lifting_scalability_enabled_flag equal to 1 when attribute data in the sub-sample or the attribute data associated with geometry data in the sub-sample is encoded by the LoD with Lifting Transform with lifting scalability enabled. Otherwise lifting_scalability_enabled_flag equal to 0.

lod indicates the maximum value of level of detail of G-PCC component in the track.

6. Embodiment 3: Each Level or a Set of Levels of G-PCC Data in its Own Track with an Extractor In this embodiment, a scalable G-PCC bitstream is represented by one or more tracks in a file. Each track represents a level of details of the scalable stream. In this case, the decoding process of higher levels of G-PCC data requires data with lower LoD values. Thus, different tracks may logically share data using corresponding Extractors.

In this embodiment, a set of one or more tracks that, when taken together, contain the complete set of encoded point cloud data. Let the lowest operating point be the one of all the operating points represented by level of details that has the least value of LoD. Tracks with higher level of details may be linked to lower tracks by means of a track reference of type 'scal' (scalable). The complete encoded information can be retained when the tracks included in the complete track group are retained.

Extractor:

In ISO/IEC 14496-15, extractors enable compact formation of tracks that extract, by reference, network abstraction layer (NAL) unit data from other tracks. Similarly, an extractor in a G-PCC bitstream is defined to enable a compact formation of tracks that extract, by reference, geometry data unit or attribute data unit from other tracks. When an extractor is processed by a file reader that acquires it, the extractor is logically replaced by the bytes it references. An extractor may contain one or more constructors for extracting data from another track that is linked to the track in which the extractor resides by means of a track reference of type 'scal'. Extractor extends the syntax structure type of TLV as follows.

TLV Type:

| tlv_type | Description |
|---|---|
| 0 | Sequence parameter set |
| 1 | Geometry parameter set |
| 2 | Geometry data unit or partial geometry data unit |
| 3 | Attribute parameter set |
| 4 | Attribute data unit or partial attribute data unit |
| 5 | Tile inventory |
| 6 | Frame boundary marker |
| 7 | Extractor |

Syntax of Extractor:

```
class aligned(8) Extractor ( ) {
    unsigned int(16) constructor_count;
    for(i =0; i < constructor_count; i++ ){
        unsigned int(8) track_ref_index;
        signed int(8) sample_offset;
        unsigned int(32) data_offset;
        unsigned int(32) data_length;
    }
}
``` constructor_type specifies the number of constructor that follows.

track_ref_index specifies the index of the track reference of type 'scal' to use to find the track from which to extract data. The sample in that track from which data is extracted is temporally aligned or nearest preceding in the media decoding timeline, i.e. using the time-to-sample table only, adjusted by an offset specified by sample_offset with the sample containing the Extractor. The first track reference has the index value 1; the value 0 is reserved.

sample_offset gives the relative index of the sample in the linked track that shall be used as the source of information. Sample 0 (zero) is the sample with the same, or the closest preceding, decoding time compared to the decoding time of the sample containing the extractor; sample 1 (one) is the next sample, sample −1 (minus 1) is the previous sample, and so on.

data_offset: The offset of the first byte within the reference sample to copy. If the extraction starts with the first byte of data in that sample, the offset takes the value 0.

data_length: The number of bytes to copy. When data_offset+data_length is greater than the size of the sample, the bytes from the byte pointed to by data_offset until the end of the sample, inclusive, are copied.

Implementation 1: Single-Track Encapsulation of G-PCC Data with Extractor

Figure 4:
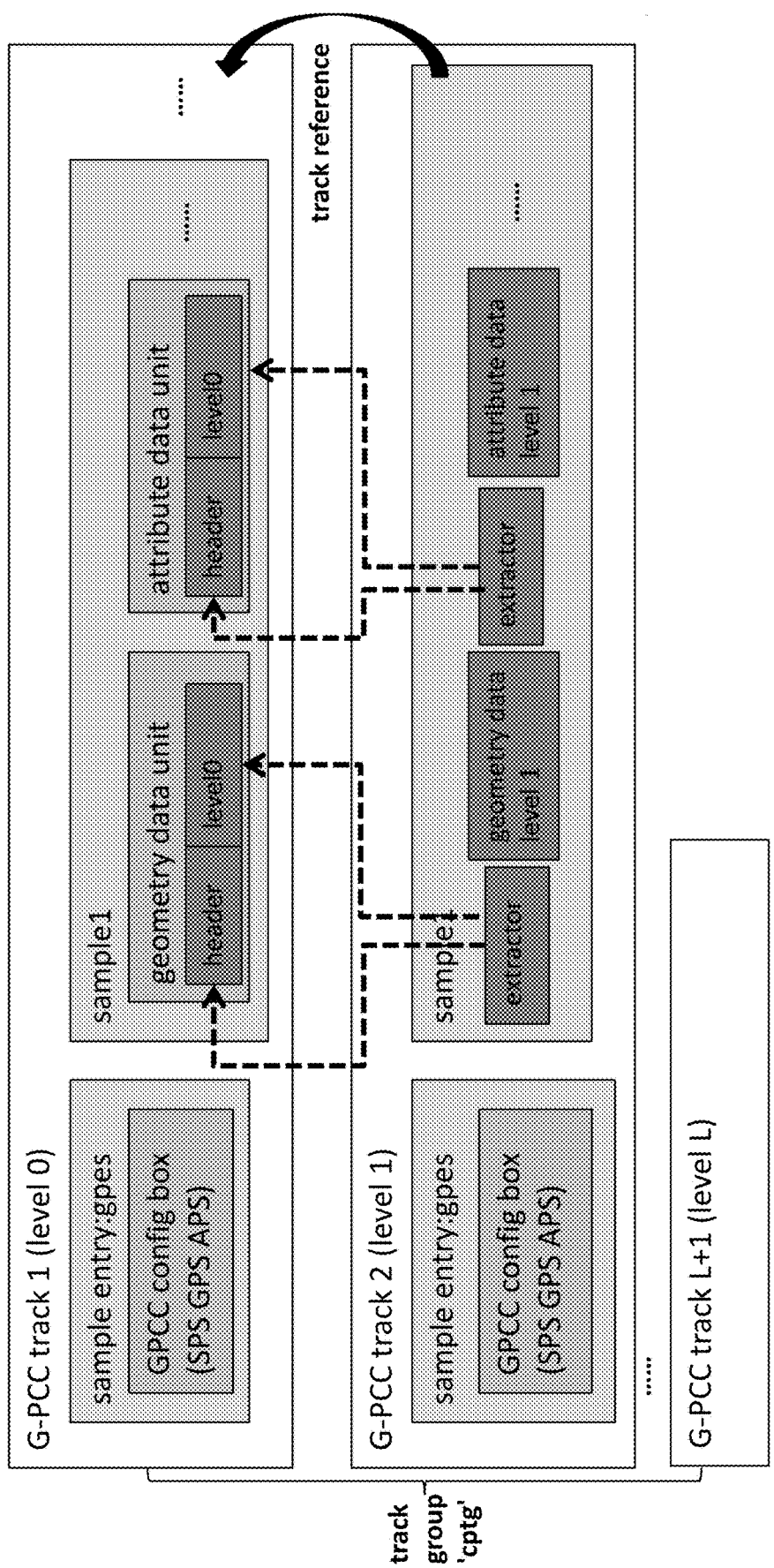
FIG. 4 shows an example of a structure of a scalable G-PCC bitstream in which different levels are represented in separate tracks with extractors.

As shown in FIG. 4, a scalable G-PCC bitstream is represented by one or more tracks in a file. Each track represents one level of the scalable stream. In that case, when G-PCC geometry data and attribute data is carried in a single track, each sample in this track contains one or more G-PCC components with the same value of LoD.

TrackGroupTypeBox with track_group_type equal to 'cptg' indicates that this track is part of the same scalable G-PCC bitstream. The complete encoded information can be retained when the tracks included in the "complete subset" are retained.

FIG. 4 shows an example of a single-track encapsulation of G-PCC data with extractor.

Sample entry 'gpes'

GPCC tracks may use VolumetricVisualSampleEntry with a sample entry type of 'gpel' or 'gpeg' or 'gpes'. Under the 'gpes' sample entry, all parameter sets (as defined in ISO/JEC 23090-9 [GPCC]) may be in the setupUnit array.

Sample Entry Type: 'gpes'
Container: SampleDescriptionBox
Mandatory: One of 'gpel', 'gpeg', 'gpcl', 'gpcg', 'gpea', 'gpcl', 'gpes', 'gpcs', 'gpei', and 'gpci' sample entry is mandatory
Quantity: One or more sample entries may be present

```
aligned(8) class GPCCSampleEntry( )
    extends VolumetricVisualSampleEntry ('gpes') {
    GPCCConfigurationBox config; //mandatory
    unsigned int(16) lod;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

lod indicates the maximum value of level of detail of geometry data and attribute data in the track.

Track Group 'cptg'

Tracks contribute to the same point cloud data have the same value of track_group_id for track_group_type 'cptg', and the track_group_id of tracks from one point cloud data differs from the track_group_id of tracks from any other point cloud data.

Syntax

```
aligned(8) class ScalableGroupBox extends
TrackGroupTypeBox('cptg') {
    unsigned int(16) lod_num;
    for(i = 0; i < lod_num; i++ ){
        unsigned int(8) entry_id;
        unsigned int(16) lod;
    }
}
``` lod_num indicates the maximum value of level of detail of a complete set of point cloud.

entry_id indicates the track_id of the entry point of a level, that is, a track with geometry data.

lod indicates the value of level of detail of the track with track_id equal to entry_id.

Implementation 2: Multi-Track Encapsulation of G-PCC Data with Extractor

Figure 5:
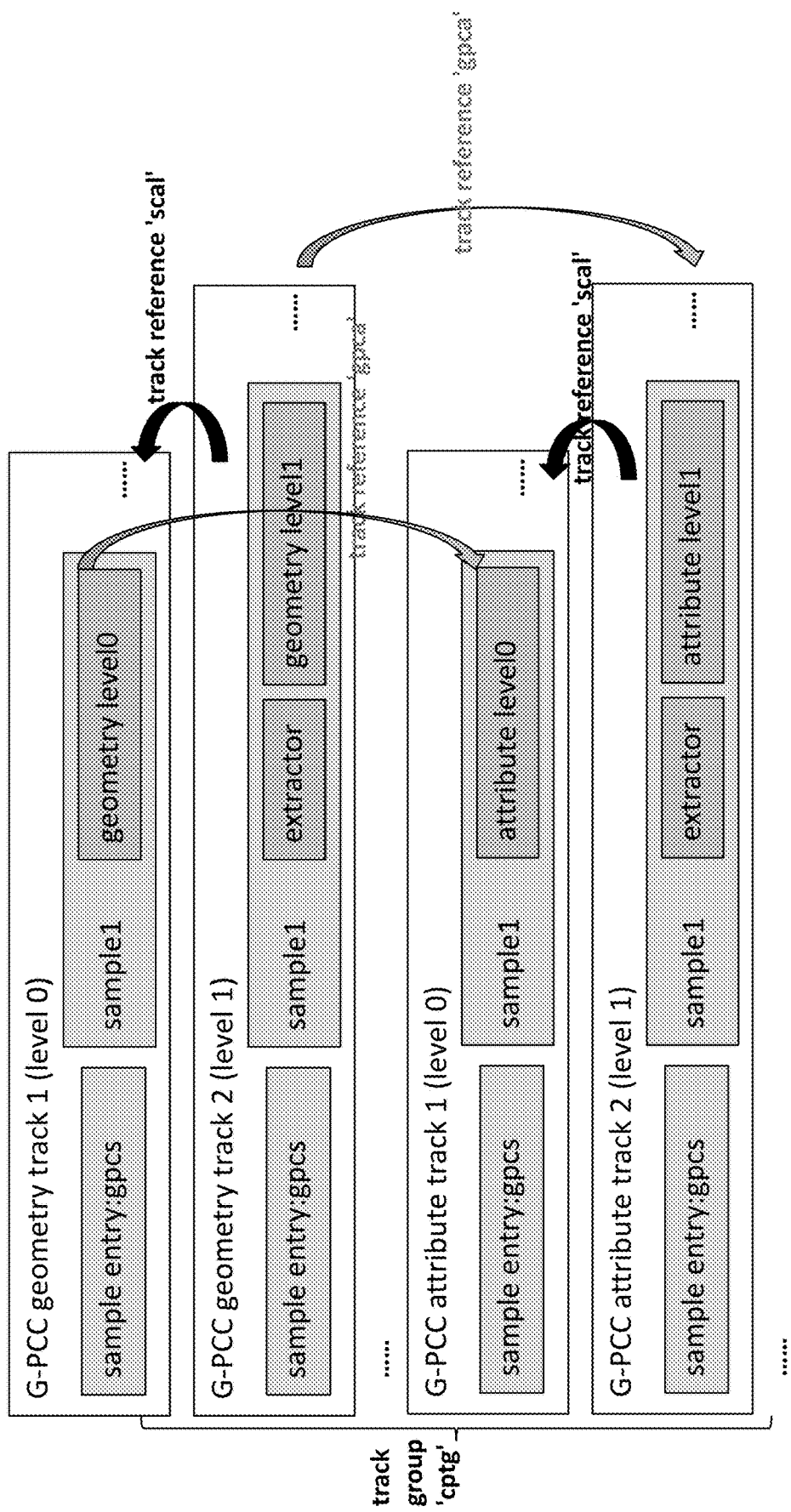
FIG. 5 shows another example structure of a scalable G-PCC bitstream in which different levels are represented in separate tracks with extractors.

As shown in FIG. 5, a scalable G-PCC bitstream is represented by one or more tracks in a file. Each track represents one operating point of the scalable stream. In this case, when G-PCC geometry data and attribute data are carried in multiple tracks, each geometry or attribute sub-stream is mapped to an individual track with the same value of LoD. The geometry track carries a geometry sub-stream and the attribute track carries a single type of the attribute sub-stream.

FIG. 5 shows an example of multi-track encapsulation of G-PCC data with an extractor.

Sample Entry 'gpcs'

GPCC tracks may use VolumetricVisualSampleEntry with a sample entry type of 'gpel' or 'gpeg' or 'gpcs'. Under the 'gpcs' sample entry, all parameter sets (as defined in ISO/JEC 23090-9 [GPCC]) may be in the setupUnit array.

Sample Entry Type: 'gpcs'
Container: SampleDescriptionBox
Mandatory: One of 'gpel', 'gpeg', 'gpcl', 'gpcg', 'gpea', 'gpcl', 'gpes', 'gpcs', 'gpei', and 'gpci' sample entry is mandatory
Quantity: One or more sample entries may be present

```
aligned(8) class GPCCSampleEntry( )
    extends VolumetricVisualSampleEntry ('gpcs') {
    GPCCConfigurationBox config; //mandatory
    GPCCComponentTypeBox type;
    unsigned int(16) lod;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

GPCCComponentTypeBox indicates the type of G-PCC component carried in this track.

lod indicates the maximum value of level of detail of G-PCC component in the track.
Syntax

```
aligned(8) class ScalableGroupBox extends
TrackGroupTypeBox('cptg') {
    unsigned int(16) lod_num;
    for(i = 0; i < lod_num; i++ ){
        unsigned int(8) entry_id;
        unsigned int(16) lod;
    }
}
``` lod_num indicates the maximum value of level of detail of a complete set of point cloud.

entry_id indicates the track_id of the entry point of a level, that is, a track with geometry data.

lod indicates the value of level of detail of the track with track_id equal to entry_id.

7. Embodiment 4: Each Level or a Set of Levels of G-PCC Data in its Own Track with Redundant Data from Lower Levels A scalable G-PCC bitstream is represented by multiple tracks in a file. Each level of G-PCC data is signaled by sub-sample structure.

In this embodiment, the sub-sample information is used to indicate information of levels of details for partial geometry data unit and a set of attribute data unit that corresponds to the specific LoD.

Figure 6:
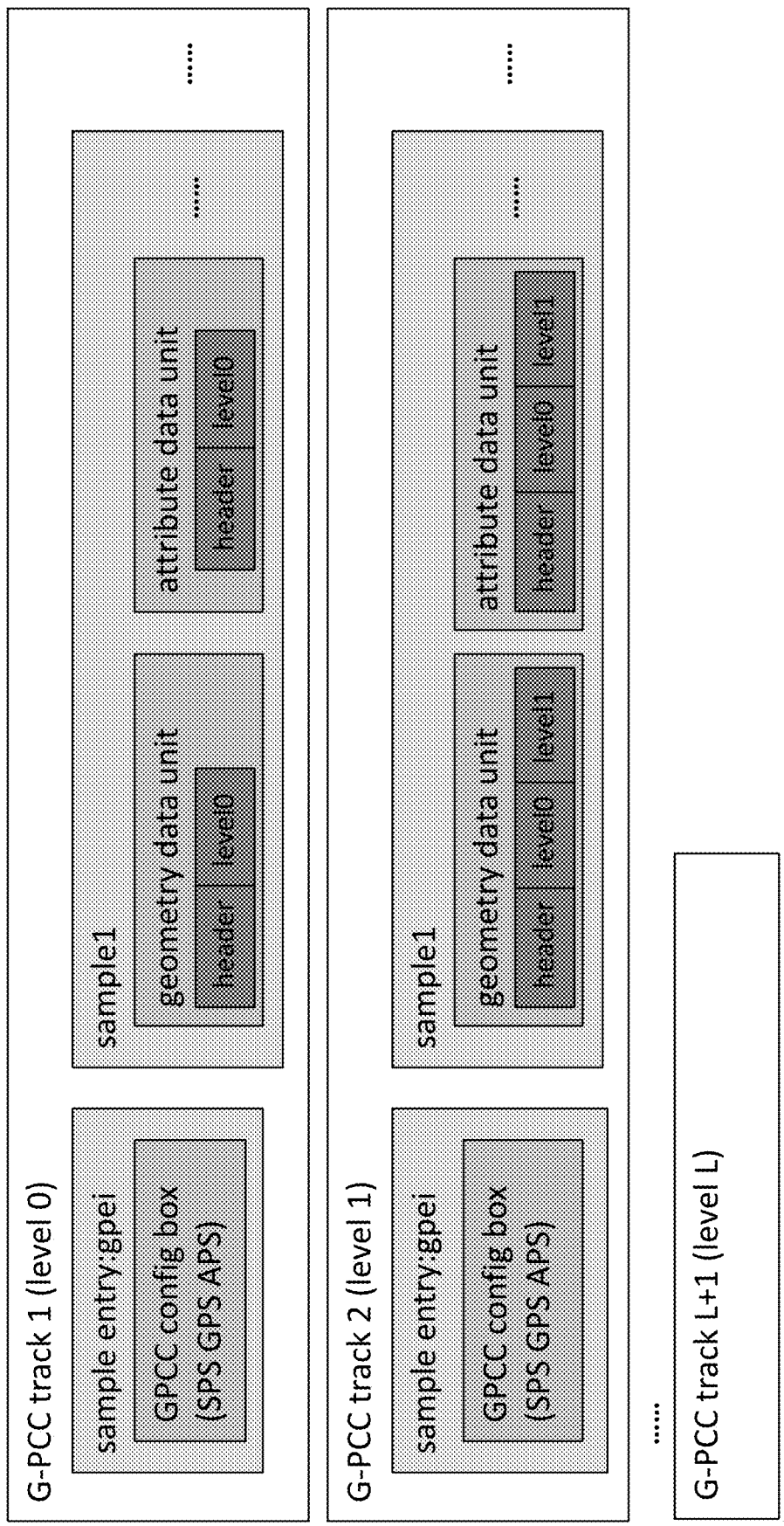
FIG. 6 shows an example of a structure of a scalable G-PCC bitstream in which different levels are represented in separate tracks with redundant data from lower levels.

Implementation 1: Single-Track Encapsulation of G-PCC Data with Redundant Levels As shown in FIG. 6, one implementation of this embodiment is that G-PCC geometry data and attribute data is carried in a single track. Each sample in this track contains one or more G-PCC components with LoD value from 0 to the maximum LoD of this track. G-PCC data in each track may be decodable independently.

In this case, GPCC tracks may use VolumetricVisualSampleEntry with a sample entry type of 'gpei'.

FIG. 6 shows an example of a single-track encapsulation of G-PCC data with redundant levels.

Sample Entry 'gpei'
Under the 'gpei' sample entry, each level of details of G-PCC geometry data and attribute data are stored in a single track.
Sample Entry Type: 'gpei'
Container: SampleDescriptionBox
Mandatory: One of 'gpel', 'gpeg', 'gpcl', 'gpcg', 'gpea', 'gpcl', 'gpes', 'gpcs', 'gpei', and 'gpci' sample entry is mandatory
Quantity: One or more sample entries may be present

```
aligned(8) class GPCCSampleEntry( )
    extends VolumetricVisualSampleEntry ('gpei') {
    GPCCConfigurationBox config; //mandatory
    unsigned int(16) lod;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

lod indicates the maximum value of level of detail of geometry data and attribute data in the track.

Implementation 2: Multi-Track Encapsulation of G-PCC Data with Redundant Levels

Figure 7:
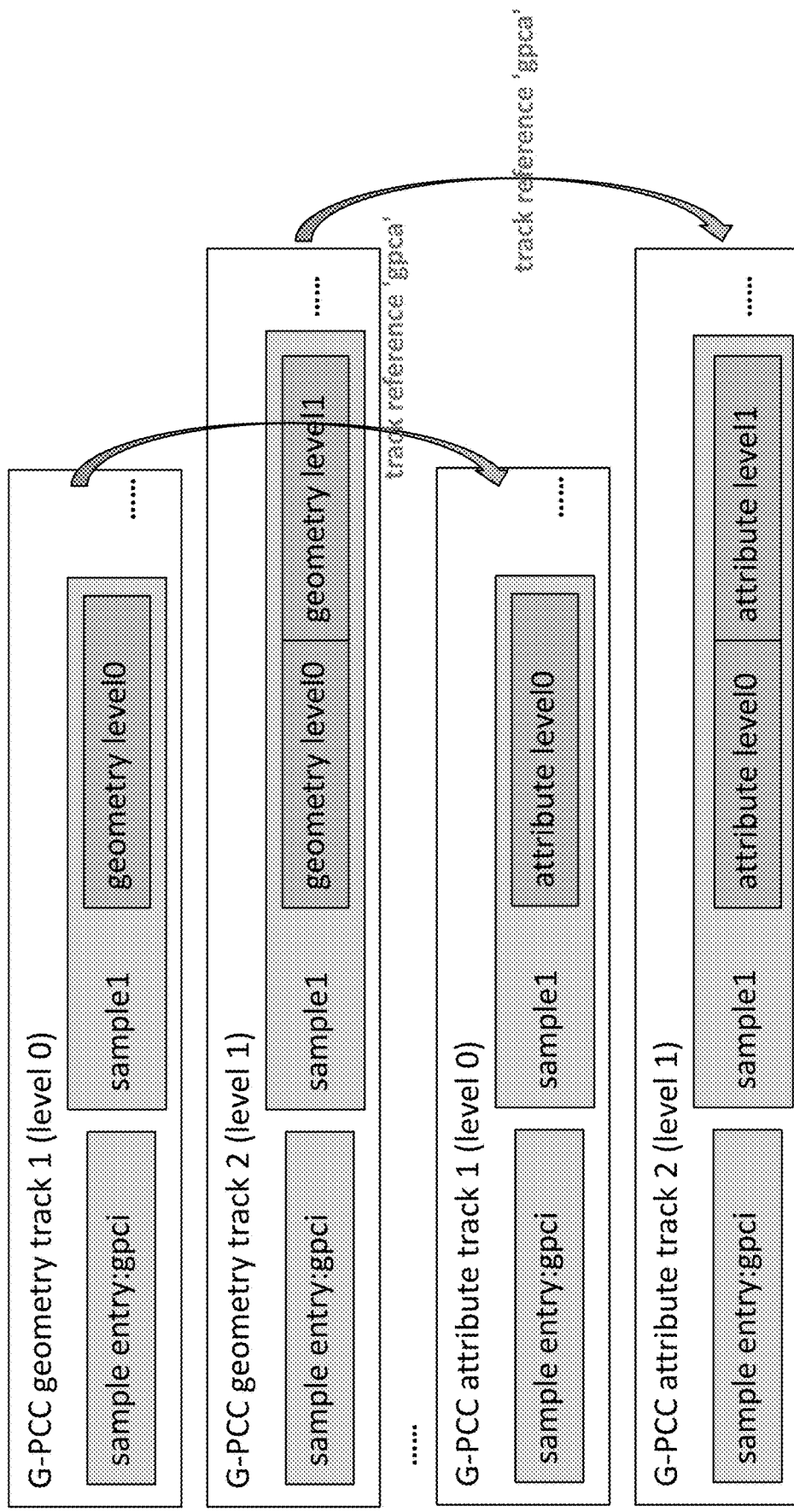
FIG. 7 shows another example structure of a scalable G-PCC bitstream in which different levels are represented in separate tracks with redundant data from lower levels.

As shown in FIG. 7, another implementation of this embodiment is that G-PCC geometry data and attribute data is carried in separate tracks and each sample in a single track contains a single type of G-PCC components with the complete levels of details. The division of each level is signaled in sub-sample structure.

In this case, GPCC tracks shall use VolumetricVisualSampleEntry with a sample entry type of 'gpci'. When the decoder is to decode and render a point cloud with its LoD equals to L, then the sub-sample with LoD value less than L is obtained.

FIG. 7 shows an example of multi-track encapsulation of G-PCC data with redundant levels.

Sample Entry 'gpci'
Under the 'gpci' sample entry, all levels of details of G-PCC geometry data are stored in a single track, and information of each level is signaled in sub-sample. And for each type of attribute data stored in separate tracks, the storage of LoD information is similar to that of geometry data.

Sample Entry Type: 'gpci'
Container: SampleDescriptionBox
Mandatory: One of 'gpel', 'gpeg', 'gpcl', 'gpcg', 'gpea', 'gpcl', 'gpes', 'gpcs', 'gpei', and 'gpci' sample entry is mandatory
Quantity: One or more sample entries may be present

```
aligned(8) class GPCCSampleEntry( )
    extends VolumetricVisualSampleEntry ('gpci') {
    GPCCConfigurationBox config; //mandatory
    GPCCComponentTypeBox type;
    unsigned int(16) lod;
}
```

GPCCConfigurationBox specifies the G-PCC decoder configuration information for geometry-based point cloud content. The setupUnit array shall include G-PCC TLV encapsulation structures that are constant for the stream referred to by the sample entry in which the decoder configuration record is present.

GPCCComponentTypeBox indicates the type of G-PCC component carried in this track.

lod indicates the maximum value of level of detail of G-PCC component in the track.

8. Embodiment 5: Signaling of LoD Descriptor of G-PCC Data

Single-Track Mode

The single-track mode in DASH enables streaming of G-PCC ISOBMFF files where geometry stream and attribute stream are stored as a single-track. The single-track mode in DASH should be represented as one AdaptationSet with one or more Representations.

Multi-Track Mode

Geometry or attribute stream may be represented in the MPD file as a separate AdaptationSet, and an AdaptationSet with geometry stream serves as the entry point of the G-PCC stream.

If a G-PCC stream has multiple levels of details, each level may be signaled using a separate AdaptationSet, and the LoD related information is signaled by GPCCLoDInfo Descriptor.

GPCCLoDInfo Descriptor

To identify the spatial scalability and LoD information of the point cloud, a GPCCLoDInfo descriptor may be used. Using this descriptor indicates current stream support spatial scalability.

At most one GPCCLoDInfo descriptor may be present at the adaptation set level in the geometry AdaptationSet and each attribute AdaptationSet of the point cloud for the multi-track mode, or in the AdaptationSet of the point cloud for the single-track mode.

The GPCCLoDInfo descriptor may include elements and attributes as specified in Table 1.

TABLE 1

| Elements and attributes for GPCCLoDInfo descriptor | Use | Data type | Description |
| --- | --- | --- | --- |
| LoDInfo | 0 . . . 1 | gpcc:LoDInfoType | An element whose attributes specify information of levels of details for the point cloud and its associated track groups. |
| LoDInfo@dependence_type | M | xs:int | This attribute specifies the dependence on tracks of lower level of details. Value 1 indicates that decoding process of the G-PCC data in current Adaptation set requires data with lower LoD values. Value 0 indicates that the G-PCC data in current Adaptation set shall be decoded independently. |
| LoDInfo@min_level | M | xs:int | This attribute indicates the minimum level of detail to which the G-PCC data in the current Adaptation set belongs. |
| LoDInfo@max_level | M | xs:int | This attribute indicates the maximum level of detail to which the G-PCC data in the current Adaptation set belongs. |
| LoDInfo@complete_set_id | O | xs:int | This attribute indicates that this Adaptation set is part of the same scalable G-PCC bitstream. This identifier corresponds to the values of the track_group_id with track_group_type equal to 'cptg'. This attribute may be absent if all levels of G-PCC data are stored as a single-track. |

Legend:

For attributes: M = Mandatory, O = Optional, OD = Optional with Default Value, CM = Conditionally Mandatory.

For elements: <minOccurs> . . . <maxOccurs> (N = unbounded)

Elements are bold; attributes are non-bold and preceded with an @.

Figure 8:
FIG. 8 shows an example of an encoding apparatus.

FIG. 8 is a diagram illustrating a first example device containing at least an example encoder for generating bitstreams that represent 3D content using one or more of the formats described in the present document. The encoder may include a video encoder or picture encoder.

Acquisition unit 1001 captures a 3D scene, including a video or a picture. Acquisition unit 1001 may be equipped with one or more cameras for shooting a video or a picture of nature scene. Optionally, acquisition unit 1001 may be implemented with a camera to get depth video or depth picture. Optionally, acquisition unit 1001 may include a component of an infrared camera. Optionally, acquisition unit 1001 may be configured with a remote sensing camera. Acquisition unit 1001 may also be an apparatus or a device of generating a video or a picture by scanning an object using radiation.

Optionally, acquisition unit 1001 may perform pre-processing on video or picture, for example, automatic white balance, automatic focusing, automatic exposure, backlight compensation, sharpening, denoising, stitching, up-sampling/down sampling, frame-rate conversion, virtual view synthesis, and etc.

Acquisition unit 1001 may also receive a video or picture from another device or processing unit. For example, acquisition unit 1001 can be a component unit in a transcoder. The transcoder feeds one or more decoded (or partial decoded) pictures to acquisition unit 1001. Another example is that acquisition unit 1001 get a video or picture from another device via a data link to that device.

Note that acquisition unit 1001 may be used to capture other media information besides video and picture, for example, audio signal. Acquisition unit 1001 may also receive artificial information, for example, character, text, computer-generated video or picture, and etc.

Encoder 1002 is an implementation of the example encoder. Input of encoder 1002 is the video or picture outputted by acquisition unit 1001. Encoder 1002 encodes the video or picture and outputs generated a 3D (e.g., G-PCC) bitstream.

Storage/Sending unit 1003 receives the video or picture bitstream from encoder 1002 and performs system layer processing on the bitstream. For example, storage/sending unit 1003 encapsulates the bitstream according to transport standard and media file format, for example, e.g. MPEG-2 TS, ISOBMFF, DASH, MMT, and etc. Storage/Sending unit 1003 stores the transport stream or media file obtained after encapsulation in memory or disk of the first example device, or sends the transport stream or media file via wireline or wireless networks.

Note that besides the video or picture bitstream from encoder 1002, input of storage/sending unit 1003 may also include audio, text, image, texture, graphic, and etc. Storage/sending unit 1003 generates a transport or media file by encapsulating such different types of media bitstreams.

The first example device described in this embodiment can be a device capable of generating or processing a video (or picture) bitstream in applications of video communication, for example, mobile phone, computer, media server, portable mobile terminal, digital camera, broadcasting device, CDN (content distribution network) device, surveillance camera, video conference device, and etc.

Figure 9:
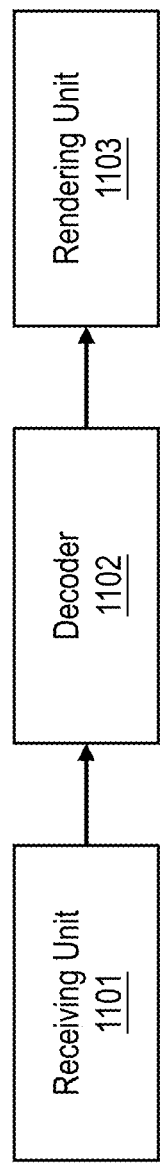
FIG. 9 shows an example of a decoding apparatus.

FIG. 9 is a diagram illustrating a second example device that may decode a bitstream having a format as disclosed in the present document to reconstruct a 3D scene. The example device may include at least a video decoder or a picture decoder.

Receiving unit 1101 receives video or picture or G-PCC bitstream by obtaining bitstream from wireline or wireless network, by reading memory or disk in an electronic device, or by fetching data from other device via a data link.

Input of receiving unit 1101 may also include transport stream or media file containing video or picture bitstream. Receiving unit 1101 extracts video or picture bitstream from transport stream or media file according to specification of transport or media file format.

Receiving unit 1101 outputs and passes video or picture bitstream to decoder 1102. Note that besides video or picture bitstream, output of receiving unit 1101 may also include audio bitstream, character, text, image, graphic and etc. Receiving unit 1101 passes the output to corresponding processing units in the second example device. For example, receiving unit 1101 passes the output audio bitstream to audio decoder in this device.

Decoder 1102 is an implementation of the example decoder. Input of encoder 1102 is the video or picture bitstream outputted by receiving unit 1101. Decoder 1102 decodes the video or picture bitstream and outputs decoded video or picture.

Rendering unit 1103 receives the decoded video or picture from decoder 1102. Rendering unit 1103 presents the decoded video or picture to viewer. Rendering unit 1103 may be a component of the second example device, for example, a screen. Rendering unit 1103 may also be a separate device from the second example device with a data link to the second example device, for example, projector, monitor, TV set, and etc. Optionally, rendering 1103 performs post-processing on the decoded video or picture before presenting it to viewer, for example, automatic white balance, automatic focusing, automatic exposure, backlight compensation, sharpening, denoising, stitching, up-sampling/down sampling, frame-rate conversion, virtual view synthesis, and etc.

Note that besides decoded video or picture, input of rendering unit 1103 can be other media data from one or more units of the second example device, for example, audio, character, text, image, graphic, and etc. Input of rendering unit 1103 may also include artificial data, for example, lines and marks drawn by a local teacher on slides for attracting attention in remote education application. Rendering unit 1103 composes the different types of media together and then presented the composition to viewer.

The second example device described in this embodiment can be a device capable of decoding or processing a video (or picture) bitstream in applications of video communication, for example, mobile phone, computer, set-top box, TV set, HMD, monitor, media server, portable mobile terminal, digital camera, broadcasting device, CDN (content distribution network) device, surveillance, video conference device, and etc.

Figure 10:
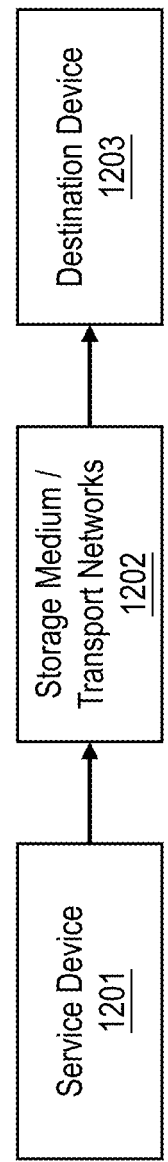
FIG. 10 shows an example of a media processing system.

FIG. 10 is a diagram illustrating an electronic system containing the first example device in FIG. 8 and the second example device in FIG. 9.

Service device 1201 is the first example device in FIG. 8.

Storage medium/transport networks 1202 may include internal memory resource of a device or electronic system, external memory resource that is accessible via a data link, data transmission network consisting of wireline and/or wireless networks. Storage medium/transport networks 1202 provides storage resource or data transmission network for storage/sending unit 1203 in service device 1201.

Destination device 1203 is the second example device in FIG. 9. Receiving unit 1201 in destination device 1203 receives a video or picture bitstream, a transport stream containing video or picture bitstream or a media file containing video or picture bitstream from storage medium/transport networks 1202.

The electronic system described in this embodiment can be a device or system capable of generating, storing or transporting, and decoding a video (or picture) bitstream in applications of video communication, for example, mobile phone, computer, IPTV systems, OTT systems, multimedia systems on Internet, digital TV broadcasting system, video surveillance system, potable mobile terminal, digital camera, video conference systems, and etc.

Figure 12:
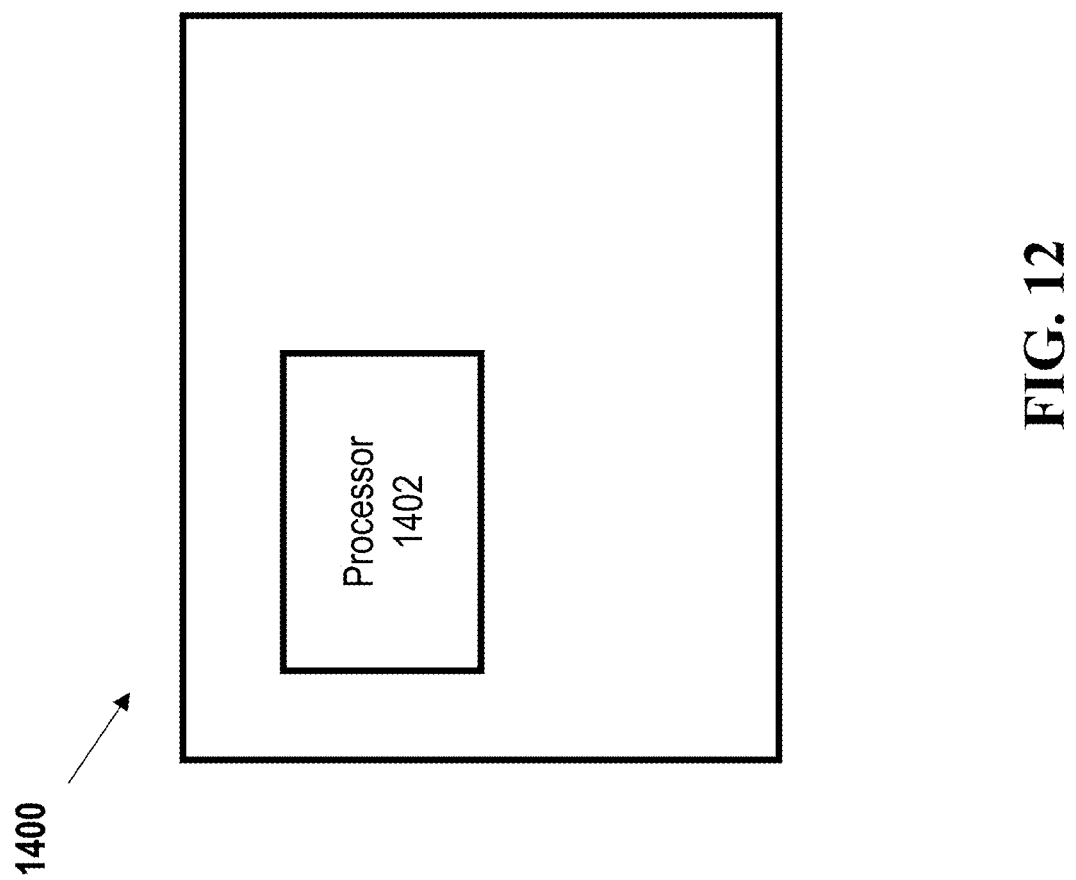
FIG. 12 is a block diagram of a hardware platform for implementing a volumetric visual media processing method described herein.

FIG. 12 shows an example apparatus 1400 that may be used to implement encoder-side or decoder-side techniques described in the present document. The apparatus 1400 includes a processor 1402 that may be configured to perform the encoder-side or decoder-side techniques or both. The apparatus 1400 may also include a memory (not shown) for storing processor-executable instructions and for storing the video bitstream and/or display data. The apparatus 1400 may include video processing circuitry (not shown), such as transform circuits, arithmetic coding/decoding circuits, look-up table based data coding techniques and so on. The video processing circuitry may be partly included in the processor and/or partly in other dedicated circuitry such as graphics processors, field programmable gate arrays (FPGAs) and so on. Other hardware details such as peripherals used for capturing or rendering 3D content are also omitted from FIG. 12 for brevity.

The volumetric visual media data encoding or decoding apparatus may be implemented as a part of a computer, a user device such as a laptop, a tablet or a gaming device.

The technical problems described in the present document with respect to video encoding and decoding technologies may be solved by some embodiments by preferably incorporating one or more of the following solutions.

Figure 11A:
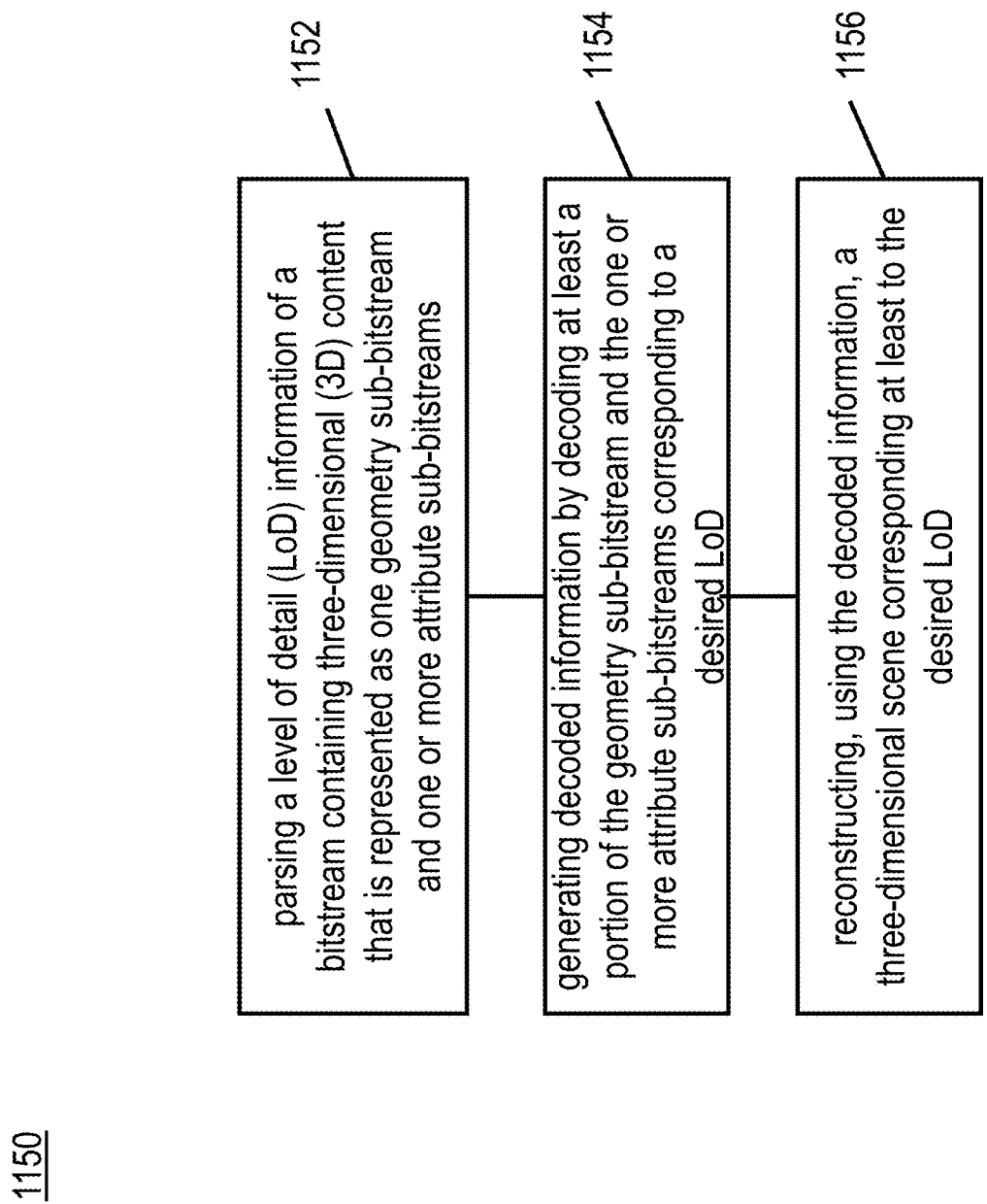
FIG. 11A is a flowchart for an example method of data processing.

1. A method of processing three-dimensional content (e.g., method 1150 shown in FIG. 11A0, comprising: parsing (1152) a level of detail (LoD) information of a bitstream containing three-dimensional (3D) content that is represented as one geometry sub-bitstream and one or more attribute sub-bitstreams; generating (1154), based on the LoD information, decoded information by decoding at least a portion of the geometry sub-bitstream and the one or more attribute sub-bitstreams corresponding to a desired level of detail; and reconstructing (1156), using the decoded information, a three-dimensional scene corresponding at least to the desired level of detail. The bitstream conforms to a format organized according to multiple levels of details of the 3D content. In some embodiments, the method 1150 may be implemented by a decoder apparatus disclosed in the present document. Embodiment 1 provides some examples of how the method may be implemented by partially accessing the bitstream for data related to the desired LoD.

2. The method of solution 1, wherein the parsing the LoD information comprises: determining whether the bitstream comprises spatial scalability sub-bitstreams; identifying a first syntax structure in the bitstream that includes multiple levels of details; identifying the LoD information using a second syntax structure, a sub-sample structure, a sample entry or a descriptor; or locating content corresponding to the desired level of detail or a complete set of levels. In various embodiments, one or more of these tasks may be performed to locate geometry and/or attribute sub-streams or sub-bitstreams related to the desired LoD or complete LoD.

3. The method of solution 2, comprising: using a sample entry type field in the bitstream for determining whether the bitstream supports a spatial scalability functionality and for the identifying the structure.

4. The method of solution 3, wherein the structure of the bitstream with multiple levels of details comprising: a structure that a complete set of levels of the bitstream is carried in one track with sub-sample structure; and a structure that each level of the bitstream in one track with extractor; and a structure that one or more levels of the bitstream in one track with redundant data from lower levels. For example, Embodiment 2 provides an example of a bitstream format in which the G-PCC data is included in one track with a sub-sample structure.

5. The method of solution 1, wherein the decoding comprises: decoding one or more sub-samples containing 3D content corresponding to the desired level of detail.

6. The method of solution 1, wherein the decoding comprises: decoding all geometry sub-bitstreams for sub-samples containing 3D content corresponding to all levels of details.

7. The method of solution 2, wherein the sub-sample structure comprises a codec_specific_parameters field extension representing the LoD information. Additional examples are provided in Embodiment 2, alternative sub-sample structures 1, 2 or 3, and implementations 1, and 2.

8. The method of solution 7, wherein the codec_specific_parameters field extension representing the LoD information includes one or more of following syntax elements: a payload type, a flag indicative of a lifting scalability, a flag indicative of whether only geometry data unit is included, a flag indicative of whether only an attribute data unit is includes, or an attribute payload.

9. The method of solution 2, comprising: identifying a value of a LoD of the bitstream using an LoD value in the sample entry.

10. The method of solution 1, wherein the decoding includes: decoding a first portion of the bitstream in a track corresponding to the desired level of detail; and identifying and decoding a second portion the bitstream in one or more other tracks with lower level of detail than the desired level of detail. For example, embodiment 3 describes some additional details of this solution.

11. The method of solution 10, comprising: identifying the other tracks with lower level of detail than the desired level using an extractor and a first track reference type; and identifying data corresponding to the other tracks using the extractor.

12. The method of solution 11, wherein the extractor comprises: one or more constructors that carry information linking a track to one or more other tracks based on a track reference type; and one or more instructions to extract data from the referenced track. Additional examples of the extractor implementations are described in, for example, Embodiment 3.

13. The method of solution 1, comprising: identifying one or more tracks containing sub-streams corresponding to complete levels of detail using a first track group type; and decoding data in the one or more tracks corresponding to complete levels of detail.

14. The method of solution 1, comprising: decoding a portion of the bitstream corresponding to the desired levels of detail and one or more lower levels in a single track.

15. The method of solution 1, comprising: decoding the bitstream corresponding to complete levels of detail in a single track.

16. The method of solution 2, comprising: using a LoD descriptor to determine whether an Adaptation Set supports a spatial scalability functionality.

17. The method of solution 16, comprising: identifying a LoD in the Adaptation Set using an LoD value in the LoD descriptor.

18. The method of solution 1, comprising: decoding a portion of the bitstream corresponding to the desired LoD and one or more lower levels from a single Adaptation Set; or identifying and decoding a portion of the bitstream corresponding to the desired LoD in one Adaptation Set and data with lower levels in other Adaptation Sets. Additional details are described, for example, in Embodiment 4.

19. The method of solution 1, comprising: identifying one or more Adaptation Sets containing data corresponding to all levels of detail using a complete track id; and decoding complete data in one or more Adaptation Sets corresponding to complete levels of detail.

20. The method of solution 16-19, wherein the LoD descriptor comprises one or more of: a syntax element whose attribute specifies information of levels of details, a syntax element indicative of dependence on lower level tracks, a minimum level of detail in the bitstream, a maximum level of detail in the bitstream, or a syntax element indicative of an identifier of the complete track id.

21. The method of solution 1-20, wherein a portion of the bitstream corresponding to the desired LoD includes: data corresponding to the desired LoD with a single-track encapsulation or a multiple-track encapsulation. Examples are described in embodiments 1 to 5.

22. The method of solution 21, wherein the single-track encapsulation comprises: the one geometry bitstream and the one or more attribute bitstreams that are encapsulated in a same track.

23. The method of solution 20, wherein the multiple-track encapsulation comprises: the one geometry bitstream and the one or more attribute bitstreams that are encapsulated in separate tracks.

24. The method of solution 1, wherein the reconstructing the three-dimensional scene comprises: reconstructing a spatial position and one or more attribute values of each point in the 3D content; or reconstructing a spatial position and attribute values of each point in the 3D content and rendering 3D scenes according to a viewing position and a viewport of a user. Some details of the above solutions are also described in Embodiments 4 and 5.

Figure 11B:
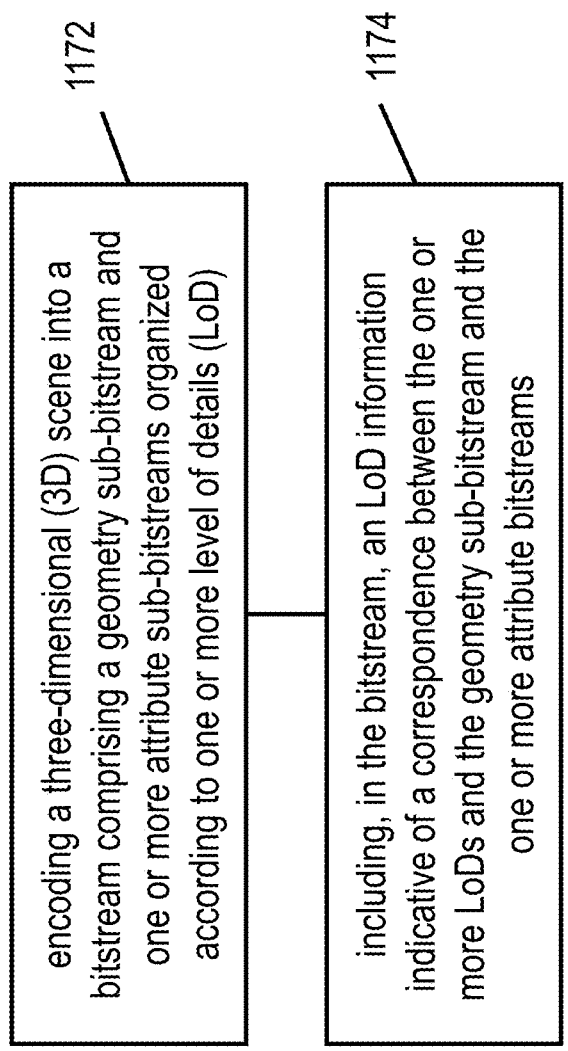
FIG. 11B is a flowchart for an example method of data processing.

25. A method of encoding three-dimensional content (e.g., method 1170 depicted in FIG. 11B), comprising: encoding (1172) a three-dimensional (3D) content into a bitstream comprising a geometry sub-bitstream and one or more attribute sub-bitstreams organized according to one or more level of details (LoD); and including (1174), in the bitstream, an LoD information indicative of a correspondence between the one or more LoDs and the geometry sub-bitstream and the one or more attribute bitstreams.

26. The method of solution 25, further including: encoding, in the bitstream, an indication of presence of spatial scalability bitstreams, including a first syntax structure in the bitstream that includes multiple levels of details; including using a second syntax structure, a sub-sample structure, a sample entry or a descriptor indicative of LoD-based content included in the bitstream.

27. The method of solution 26, further comprising: including, in the bitstream a sample entry type field allowing a determination of whether the bitstream supports a spatial scalability functionality and for the identifying the structure.

28. The method of solution 27, wherein the structure of the bitstream with multiple levels of details comprising: a structure that a complete set of levels of the bitstream is carried in one track with sub-sample structure; a structure that each level of the bitstream in one track with extractor; and a structure that one or more levels of the bitstream in one track with redundant data from lower levels.

29. The method of solution 26, wherein the sub-sample structure comprises a codec_specific_parameters field extension representing the LoD information.

30. The method of solution 29, wherein the codec_specific_parameters field extension representing the LoD information includes one or more of following syntax elements: a payload type, a flag indicative of a lifting scalability, a flag indicative of whether only geometry data unit is included, a flag indicative of whether only an attribute data unit is includes, or an attribute payload.

31. The method of solution 26, comprising: including, in the bitstream, an LoD value in the sample entry identifying a value of a LoD of the bitstream.

32. The method of solution 31, comprising: including, in the bitstream, an extractor and a first track reference type identifying the other tracks with lower level of detail than the desired level of detail and data corresponding to the other tracks.

33. The method of solution 32, wherein the extractor comprises: one or more constructors that carry information linking a track to one or more other tracks based on a track reference type; and one or more instructions to extract data from the referenced track.

34. The method of solution 25, comprising: including, in the bitstream, a first track group type identifying one or more tracks containing sub-streams corresponding to complete levels of detail.

35. The method of solution 26, comprising: including a LoD descriptor indicative of whether an Adaptation Set supports a spatial scalability functionality.

36. The method of solution 35, wherein the LoD descriptor include an LoD value that identifies a LoD in the Adaptation Set.

37. The method of solution 25-26, wherein a portion of the bitstream corresponding to the desired LoD includes: data corresponding to the desired LoD with a single-track encapsulation or a multiple-track encapsulation.

38. The method of solution 37, wherein the single-track encapsulation comprises: the one geometry bitstream and the one or more attribute bitstreams that are encapsulated in a same track.

39. The method of solution 37, wherein the multiple-track encapsulation comprises: the one geometry bitstream and the one or more attribute bitstreams that are encapsulated in separate tracks.

Additional details of the encoding solutions described above are also disclosed in Embodiments 1 to 5, as is further described with respect to the decoder solutions.

40. A three-dimensional content processing apparatus comprising a processor configured to implement a method recited in any one or more of solutions 1-39.

41. A computer program product comprising program code stored on a computer readable medium, the program code, when executed by a processor, causing the processor to implement a method recited in any one or more of solutions 1-39.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing three-dimensional content, comprising:
   parsing a level of detail (LoD) information of a bitstream containing three-dimensional (3D) content that is represented as one geometry sub-bitstream and one or more attribute sub-bitstreams, wherein the parsing the LoD information comprises identifying a first syntax structure in the bitstream that includes multiple levels of details;
   generating, based on the LoD information, decoded information by decoding at least a portion of the geometry sub-bitstream and the one or more attribute sub-bitstreams corresponding to a desired level of detail;
   reconstructing, using the decoded information, a three-dimensional scene corresponding at least to the desired level of detail,
   wherein the bitstream conforms to a format organized according to multiple levels of details of the 3D content; and
   using a sample entry type field in the bitstream for determining whether the bitstream supports a spatial scalability functionality and for the identifying the first syntax structure, wherein the first syntax structure of the bitstream with multiple levels of details comprises:
      a first structure in which a complete set of levels of the bitstream is carried in one track with sub-sample structure;
      a second structure that includes an extractor with each level of the bitstream in the one track; and
      a third structure that includes one or more levels of the bitstream in the one track with redundant data from lower levels.

2. The method of claim 1, wherein the parsing the LoD information comprises:
   determining whether the bitstream comprises spatial scalability sub-bitstreams;
   identifying the LoD information using a second syntax structure, a sub-sample structure, a sample entry or a descriptor; or
   locating content corresponding to the desired level of detail or the complete set of levels.

3. The method of claim 2, wherein the sub-sample structure comprises a codec_specific_parameters field extension representing the LoD information.

4. The method of claim 2, further comprising:
   identifying a value of a LoD of the bitstream using an LoD value in the sample entry.

5. The method of claim 1, further comprising:
   identifying one or more tracks containing sub-streams corresponding to complete levels of detail using a first track group type; and
   decoding data in the one or more tracks corresponding to complete levels of detail.

6. The method of claim 1, further comprising:
   decoding a portion of the bitstream corresponding to the desired levels of detail and one or more lower levels in a single track.

7. The method of claim 2, further comprising:
   using a LoD descriptor to determine whether an Adaptation Set supports the spatial scalability functionality; and
   identifying a LoD in the Adaptation Set using an LoD value in the LoD descriptor.

8. The method of claim 1, further comprising:
   decoding a portion of the bitstream corresponding to the desired LoD and one or more lower levels from a single Adaptation Set; or
   identifying and decoding a portion of the bitstream corresponding to the desired LoD in one Adaptation Set and data with lower levels in other Adaptation Sets.

9. The method of claim 1, further comprising:
   identifying one or more Adaptation Sets containing data corresponding to all levels of detail using a complete track id; and
   decoding complete data in one or more Adaptation Sets corresponding to complete levels of detail.

10. The method of claim 1,
    wherein a portion of the bitstream corresponding to the desired LoD includes data corresponding to the desired LoD with a single-track encapsulation, and
    wherein the single-track encapsulation comprises the one geometry sub-bitstream and the one or more attribute bitstreams that are encapsulated in a same track.

11. The method of claim 1,
    wherein a portion of the bitstream corresponding to the desired LoD includes data corresponding to the desired LoD with a multiple-track encapsulation, and
    wherein the multiple-track encapsulation comprises the one geometry sub-bitstream and the one or more attribute bitstreams that are encapsulated in separate tracks.

12. The method of claim 1, wherein the reconstructing the three-dimensional scene comprises:
    reconstructing a spatial position and one or more attribute values of each point in the 3D content; or
    reconstructing a spatial position and attribute values of each point in the 3D content and rendering 3D scenes according to a viewing position and a viewport of a user.

13. An apparatus, comprising a processor configured to implement a method that causes the apparatus to:
    parse a level of detail (LoD) information of a bitstream containing three-dimensional (3D) content that is represented as one geometry sub-bitstream and one or more attribute sub-bitstreams, wherein the parsing the LoD information comprises identify a first syntax structure in the bitstream that includes multiple levels of details;
    generate, based on the LoD information, decoded information by decoding at least a portion of the geometry sub-bitstream and the one or more attribute sub-bitstreams corresponding to a desired level of detail;
    reconstruct, using the decoded information, a three-dimensional scene corresponding at least to the desired level of detail,
    wherein the bitstream conforms to a format organized according to multiple levels of details of the 3D content; and
    use a sample entry type field in the bitstream for a determination of whether the bitstream supports a spatial scalability functionality and for the identify the first syntax structure, wherein the first syntax structure of the bitstream with multiple levels of details comprises:
    a first structure in which a complete set of levels of the bitstream is carried in one track with sub-sample structure;
    a second structure that includes an extractor with each level of the bitstream in the one track; and
    a third structure that includes one or more levels of the bitstream in the one track with redundant data from lower levels.

14. The apparatus of claim 13, wherein the LoD information is parsed by the processor configured to:
    determine whether the bitstream comprises spatial scalability sub-bitstreams;
    identify the LoD information using a second syntax structure, a sub-sample structure, a sample entry or a descriptor; or
    locate content corresponding to the desired level of detail or the complete set of levels.

15. The apparatus of claim 14, wherein the sub-sample structure comprises a codec_specific_parameters field extension representing the LoD information.

16. The apparatus of claim 14, wherein the processor is further configured to:
    identify a value of a LoD of the bitstream using an LoD value in the sample entry.

17. The apparatus of claim 14, wherein the processor is further configured to:
    use a LoD descriptor to determine whether an Adaptation Set supports the spatial scalability functionality; and
    identify a LoD in the Adaptation Set using an LoD value in the LoD descriptor.

18. The apparatus of claim 13, wherein the processor is further configured to:
    identify one or more tracks containing sub-streams corresponding to complete levels of detail using a first track group type; and
    decode data in the one or more tracks corresponding to complete levels of detail.

19. The apparatus of claim 13, wherein the processor is further configured to:
    decode a portion of the bitstream corresponding to the desired levels of detail and one or more lower levels in a single track.

20. The apparatus of claim 13, wherein the processor is further configured to:
 decode a portion of the bitstream corresponding to the desired LoD and one or more lower levels from a single Adaptation Set; or
 identify and decoding a portion of the bitstream corresponding to the desired LoD in one Adaptation Set and data with lower levels in other Adaptation Sets.

21. The apparatus of claim 13, wherein the processor is further configured to:
 identify one or more Adaptation Sets containing data corresponding to all levels of detail using a complete track id; and
 decode complete data in one or more Adaptation Sets corresponding to complete levels of detail.

22. The apparatus of claim 13,
 wherein a portion of the bitstream corresponding to the desired LoD includes data corresponding to the desired LoD with a single-track encapsulation, and
 wherein the single-track encapsulation comprises the one geometry sub-bitstream and the one or more attribute bitstreams that are encapsulated in a same track.

23. The apparatus of claim 13,
 wherein a portion of the bitstream corresponding to the desired LoD includes data corresponding to the desired LoD with a multiple-track encapsulation, and
 wherein the multiple-track encapsulation comprises the one geometry sub-bitstream and the one or more attribute bitstreams that are encapsulated in separate tracks.

24. The apparatus of claim 13, wherein the three-dimensional scene is reconstructed by the processor configured to:
 reconstruct a spatial position and one or more attribute values of each point in the 3D content; or
 reconstruct a spatial position and attribute values of each point in the 3D content and render 3D scenes according to a viewing position and a viewport of a user.

* * * * *